(12) United States Patent
Yuan et al.

(10) Patent No.: US 8,248,921 B2
(45) Date of Patent: Aug. 21, 2012

(54) SYSTEM AND METHOD OF DISTRIBUTING DIGITAL CONTENT

(75) Inventors: Chin Yuan, San Ramon, CA (US); Kuo-Hui Liu, San Ramon, CA (US); Christopher Chase, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1160 days.

(21) Appl. No.: 11/592,706

(22) Filed: Nov. 3, 2006

(65) Prior Publication Data

US 2008/0107017 A1 May 8, 2008

(51) Int. Cl.
*G01R 31/08* (2006.01)
(52) U.S. Cl. .................................. 370/222
(58) Field of Classification Search .............. None
See application file for complete search history.

(56) References Cited

U.S. PATENT DOCUMENTS

| | | | | |
|---|---|---|---|---|
| 6,711,125 B1 * | 3/2004 | Walrand et al. | ........ | 370/223 |
| 6,744,769 B1 * | 6/2004 | Siu et al. | ........ | 370/395.32 |
| 6,859,431 B1 * | 2/2005 | Tedijanto et al. | ........ | 370/223 |
| 6,978,090 B1 * | 12/2005 | Forbes et al. | ........ | 398/59 |
| 7,095,714 B2 * | 8/2006 | Suetsugu et al. | ........ | 370/222 |
| 7,515,531 B2 * | 4/2009 | Sinha et al. | ........ | 370/224 |
| 7,545,735 B1 * | 6/2009 | Shabtay et al. | ........ | 370/217 |
| 7,660,238 B2 * | 2/2010 | Adler | ........ | 370/223 |
| 7,852,754 B2 * | 12/2010 | Khanna et al. | ........ | 370/222 |
| 2003/0152027 A1 * | 8/2003 | Takagi | ........ | 370/222 |
| 2004/0208118 A1 * | 10/2004 | DeBoer et al. | ........ | 370/223 |
| 2007/0217331 A1 * | 9/2007 | Khanna et al. | ........ | 370/224 |

\* cited by examiner

*Primary Examiner* — Chi Pham
*Assistant Examiner* — Mohammad Adhami
(74) *Attorney, Agent, or Firm* — Toler Law Group, PC (57) ABSTRACT

A method is disclosed that includes receiving a data packet at a first video distribution hub via a first link. The method also includes determining whether a second link has failed, wherein the first video distribution hub communicates with a second video distribution hub via a primary network path that includes the second link. When the second link has failed, a backup network path to send the data packet, or a copy thereof, to the second video distribution hub, is determined based on data stored at the first video distribution hub. The method also includes sending the data packet, or the copy thereof, to the second video distribution hub via the backup network path, wherein the backup network path does not include the second link.

25 Claims, 6 Drawing Sheets

SYSTEM AND METHOD OF DISTRIBUTING DIGITAL CONTENT

FIELD OF THE DISCLOSURE

The present disclosure relates generally to distributing digital content.

BACKGROUND

Communication service providers can provide communications services to multiple households simultaneously. As service areas become larger, additional infrastructure is typically employed. If a device or connection in such infrastructure fails, however, distributing content to the rest of the network may depend on identifying and repairing the failure, re-generating data packets at a head-end device, or other solutions that may result in congestion or other delays in data traffic. Hence, there is a need for an improved system and method of distributing digital content.

DETAILED DESCRIPTION OF THE DRAWINGS

A system to distribute digital content is disclosed and includes a first video distribution hub coupled to a first link and coupled to a second link. The first video distribution hub is adapted to receive a data packet via the first link and to communicate the data packet, or a copy thereof, to a second video distribution hub via a primary network path that includes the second link when the second link has not failed. The first video distribution hub is adapted to communicate the data packet, or a copy thereof to the second video distribution hub via a backup network path that does not include the second link when the second link has failed. The backup network path is determined based on data stored at the first video distribution hub.

In a particular embodiment, the backup network path can be viewed as an alternative route from the first distribution hub to the second distribution hub and is only used when the second link has failed. Each physical link between any two adjacent distribution hubs has one primary network path but at least one alternative backup network path.

In another particular embodiment, a method of distributing digital content is disclosed and includes receiving a data packet at a first video distribution hub via a first link. The method also includes determining whether a second link has failed, wherein the first video distribution hub communicates with a second video distribution hub via a primary network path that includes the second link. When the second link has failed, a backup network path to send the data packet, or a copy thereof, to the second video distribution hub, is determined based on data stored at the first video distribution hub. The method also includes sending the data packet, or the copy thereof, to the second video distribution hub via the backup network path, wherein the backup network path does not include the second link.

In another particular embodiment, a computer-readable medium is disclosed and includes instructions executable to determine whether a link between a first video distribution hub and a second video distribution hub has failed, where the first distribution hub communicates with the second distribution hub via a primary network path that includes the link. The computer-readable medium also includes instructions to determine, when the second link has failed, a backup network path to send a data packet from the first video distribution hub to the second video distribution hub, the backup network path determined based on data stored at the first video distribution hub. The computer-readable medium also includes instructions to send the data packet to the second video distribution hub via the backup network path, wherein the backup network path does not include the link.

In another particular embodiment, a network is disclosed and includes a plurality of nodes including a first video distribution hub and a second video distribution hub, where the plurality of nodes are connected via Multi-Protocol Packet Label Switching (MPLS) links to form at least one network ring. A data packet including video content is routed from the first video distribution hub to the second video distribution hub via a primary network path when a MPLS link connecting the first video distribution hub to the second video distribution hub has not failed. The data packet is re-routed from the first video distribution hub to the second video distribution hub via a backup network path that does not include the MPLS link when the MPLS link has failed, the backup network path pre-defined at the first video distribution hub.

Figure 1:
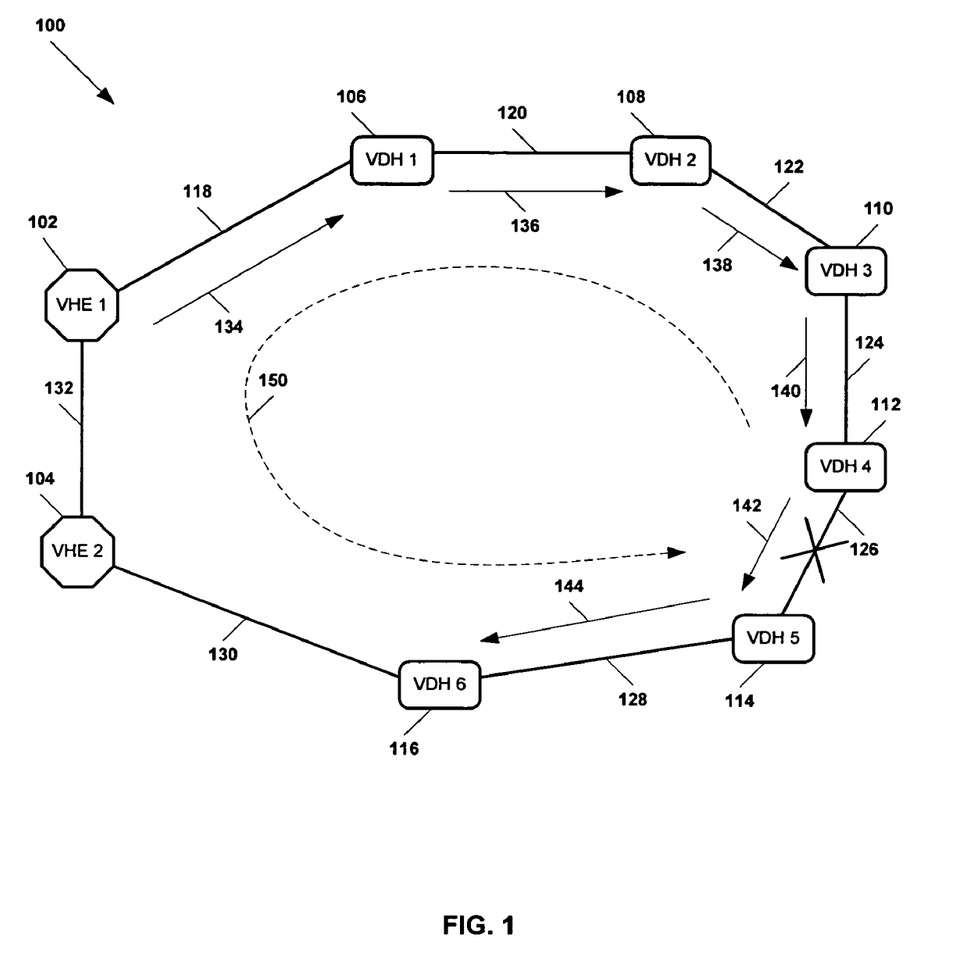
FIG. 1 is a block diagram of a particular illustrative embodiment of a system to distribute digital content.

Referring to FIG. 1, a particular illustrative embodiment of a system to distribute digital content is illustrated and designated generally at 100. The system 100 includes a first video head-end (VHE) 102 that communicates with a video content source via a satellite system or other broadcast or data system. In a particular embodiment, the system 100 can include a second VHE 104, such as a back-up VHE, which also communicates with the video content source. The system 100 also includes a plurality of video distribution hubs (VDHs) 106-116 that are adapted to receive data packets, or copies of data packets, from the video head-ends 102, 104. In an illustrative embodiment, each of the VHEs and VDHs can include one or more devices, such as one or more servers, switches, routers, or other devices, where each device can be adapted to perform one or more of the functions of the VHE or VDH with respect to distributing digital content, such as receiving a data packet, sending a data packet, storing data, determining a network path, and other functions.

In a particular embodiment, the first VHE 102 and second VHE 104 can be adapted to communicate video content with user communications devices via the plurality of VDHs 106-116. For example, the first VHE 102 and second VHE 104 can be adapted to communicate multicast video content of an Internet Protocol Television (IPTV) system to set-top box devices via the VDHs 106-116. In another particular embodiment, other content, such as voice content, data content, or any combination thereof, can be transmitted via the VDHs 106-116 to other user devices, such as Voice-over Internet Protocol (VoIP) phones, computing devices, other devices, or any combination thereof. In an illustrative embodiment, the first VHE 102 and the second VHE 104 can provide digital content over a national network, where the plurality of VDHs 106-116 serve a plurality of regions. In another embodiment, the first VHE 102 and the second VHE 104 can provide digital content over a regional network, where the plurality of VDHs 106-116 serve a plurality of neighborhoods or other sub-regions.

Figure 2:
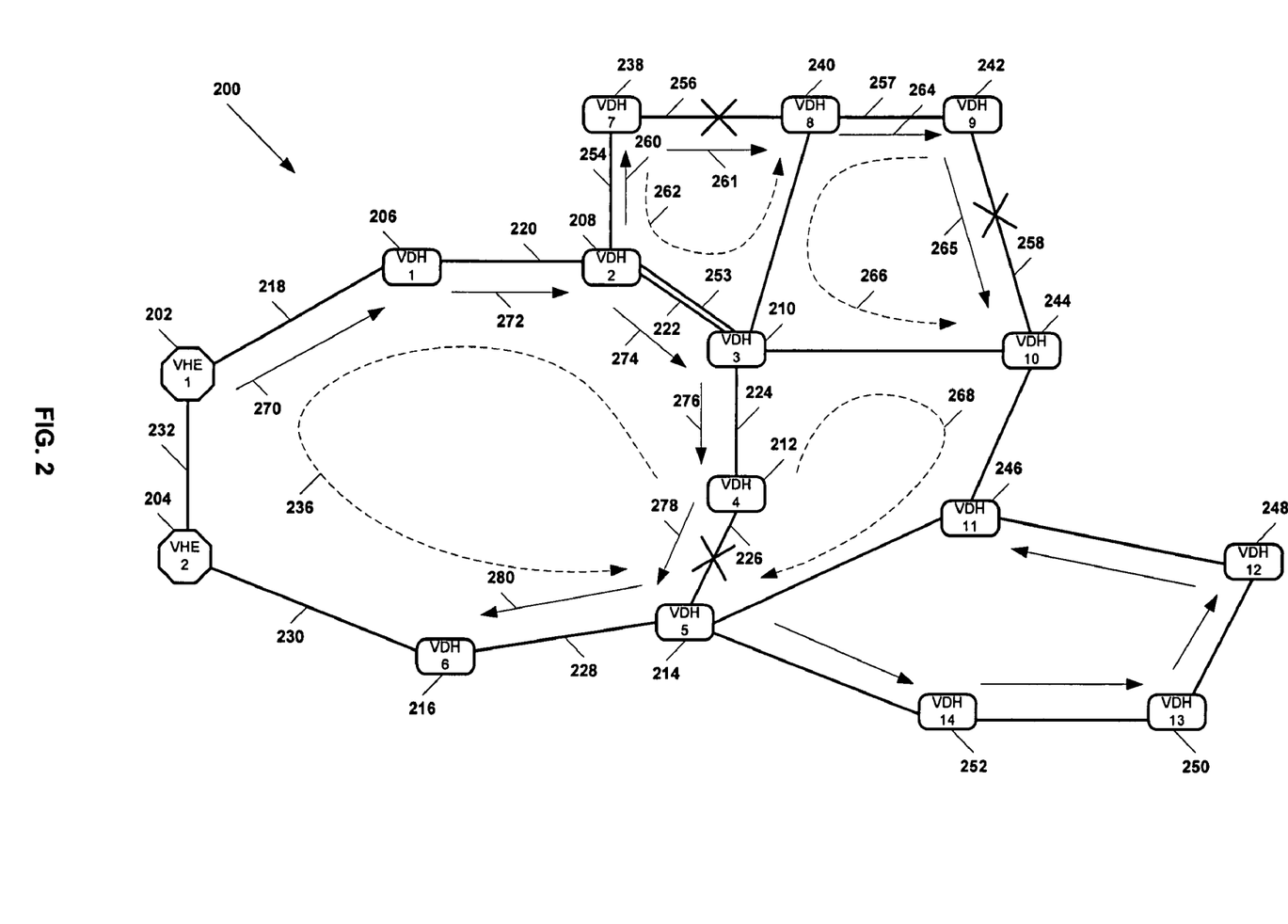
FIG. 2 is a block diagram of a second particular illustrative embodiment of a system to distribute digital content.
Figure 3:
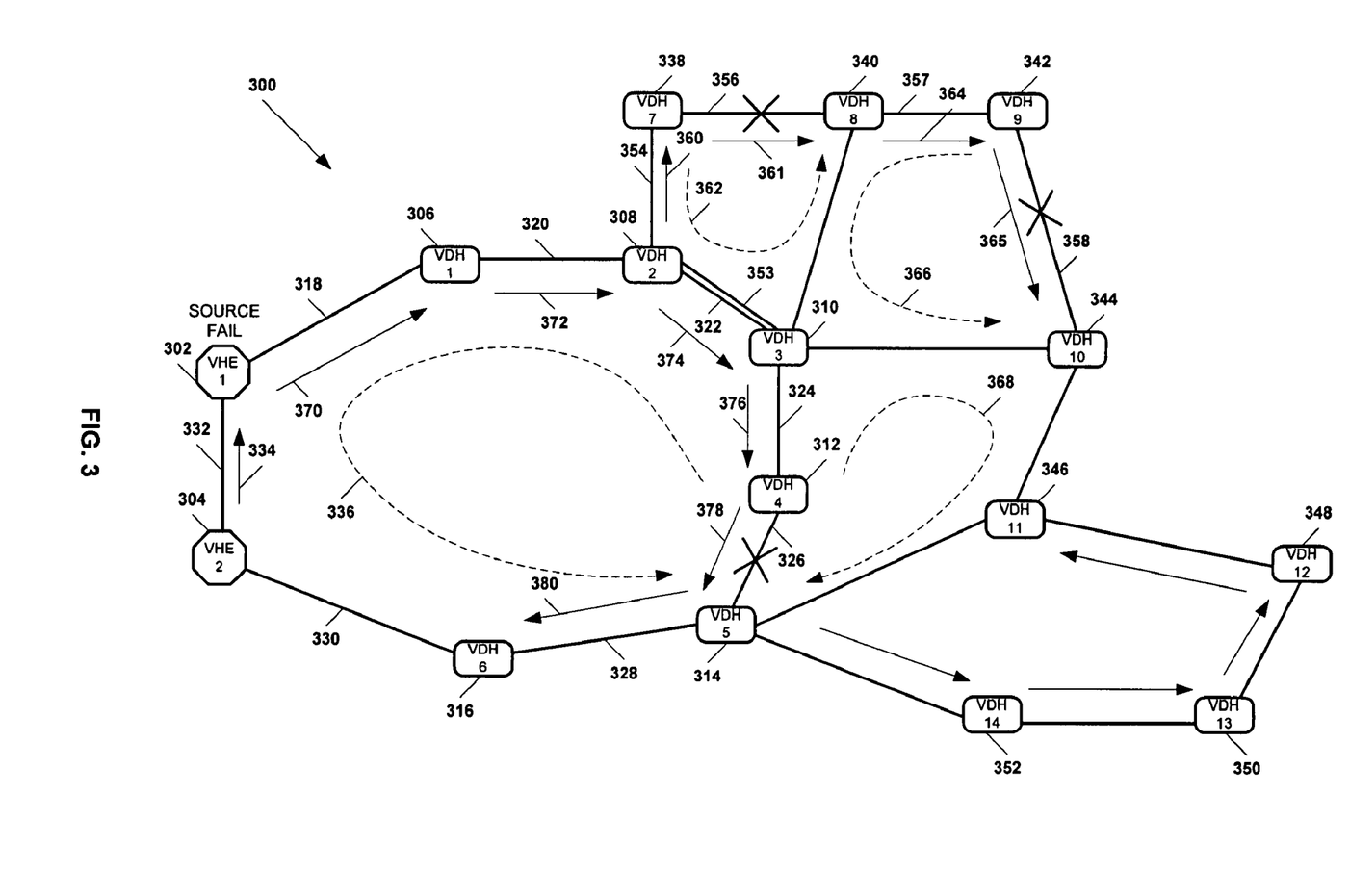
FIG. 3 is a block diagram of a third particular illustrative embodiment of a system to distribute digital content.
Figure 4:
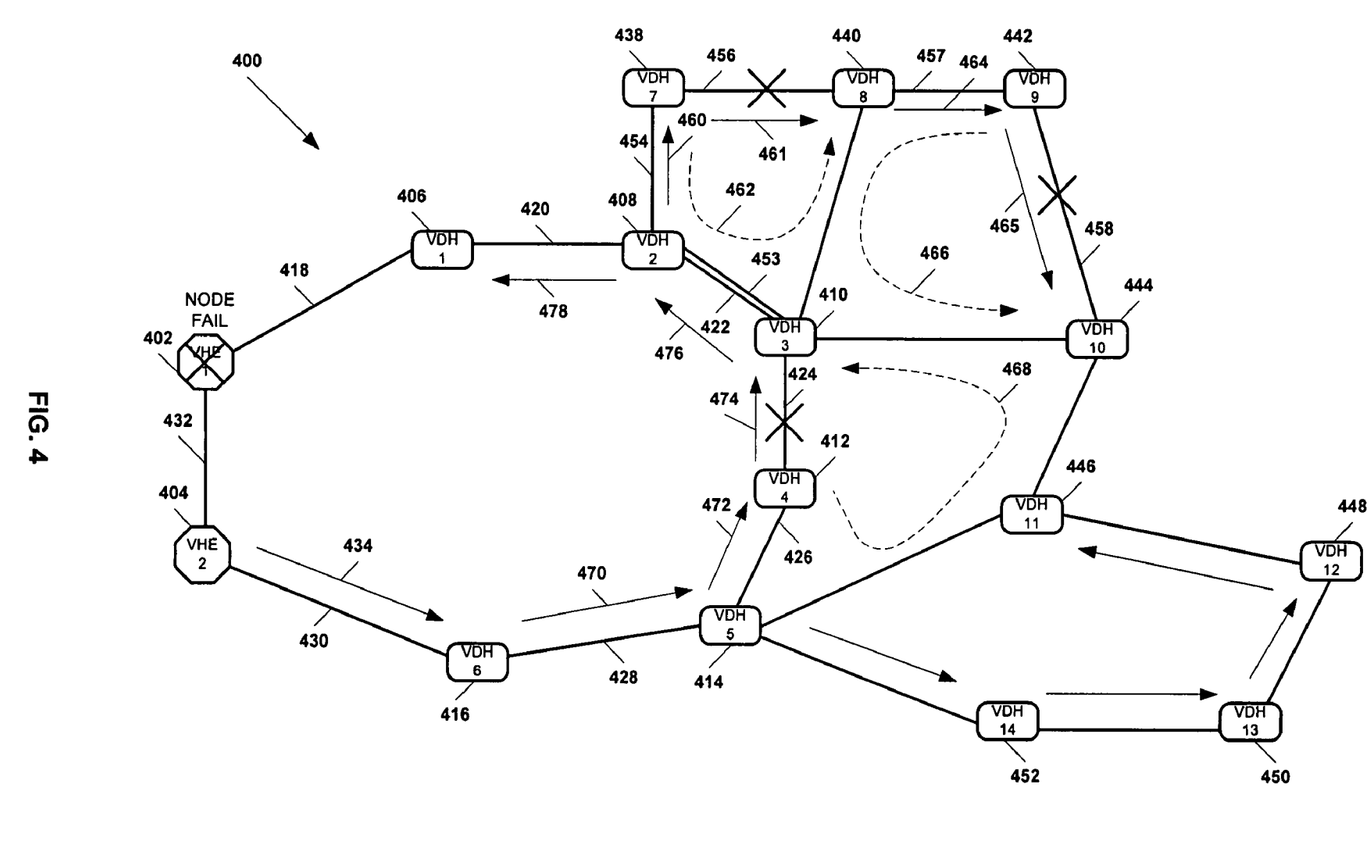
FIG. 4 is a block diagram of a fourth particular illustrative embodiment of a system to distribute digital content.

The first VHE 102, the second VHE 104, and the plurality of VDHs 106-116, comprise nodes of a network ring topology or similar architecture. Network ring topologies can be advantageous because they can minimize the number of copies of broadcast or multicast video content sent from the first VHE 102 or the second VHE 104. Hence, the required bandwidth of the network may be reduced. For example, the first VHE 102 can send one copy of a data packet, and the copy can be propagated along the ring via the primary network paths 134-144, or backup network paths including the backup network path 150, such that all VDHs 106-116 on the ring will receive the copy. In a particular embodiment, the network topology or architecture can include multiple cascaded rings, where additional rings receive copies of a data packet from one or more of the plurality of VDHs 106-116. Examples of cascaded ring topologies are illustrated in FIGS. 2-4.

As illustrated in FIG. 1, the various nodes 102-116 of the ring are connected via a plurality of links 118-132. For example, the first VHE 102 can communicate with a first VDH 106 via a first link 118. In addition, the first VDH 106 can communicate with a second VDH 108 via a second link 120. Further, the second VDH 108 can communicate with a third VDH 110 via a third link 122. The third VDH 110 can communicate with a fourth VDH 112 via a fourth link 124, and so on. Moreover, the first VHE 102 can communicate with the second VHE 104 via another link 132.

In a particular embodiment, each of the links 118-132 can be a Multi-Protocol Label Switching (MPLS) link. MPLS technology can provide fast restoration (~50 milliseconds) for link failures via its path protection mechanism, which can be advantageous for multicast video and other real-time content. In addition, the MPLS path protection is operated on the logical level and can often eliminate the need for physical layer protection. In a network ring topology, for example, MPLS path protection is conducted by re-routing data packets in the opposite direction of normal traffic flow. Thus, additional links are not typically required, as when path protection is performed at the physical level.

With respect to each link between two adjacent nodes of the ring, there is a single primary network path that is coincident with the link. The primary network path begins at a VHE or a VDH sending the packet and ends at the next VDH receiving the packet along the ring. For example, the primary network path 142 that corresponds to the link 126 begins at the fourth VDH 112 and ends at the fifth VDH 114. The primary network paths 134-144 follow a same direction, such as clockwise or counterclockwise along the ring. In a particular embodiment, a link cost of IP routing can be assigned to each physical link, thereby causing packet forwarding to follow a preferred direction along the ring.

For example, a data packet may travel to the fifth VDH 114 via links 132-130-128, even in the absence of a link failure among physical links 118-126, if all physical links 118-132 have equal link costs. Link costs of physical links 128, 130, 132, or any combination thereof, can be assigned such that a data packet will be sent to the fifth VDH 114 via the primary network paths 134-142 through physical links 118-126, in the absence of a link failure in links 118-126, even though this is not the route with the least number of hops between adjacent nodes. In an illustrative embodiment, a cost of routing a data packet via a particular physical link can be assigned as a function of bandwidth or any artificial number, such that sending data packets via the primary paths 134-142 will appear more efficient or otherwise more optimal to an IP router, in absence of a link failure, than sending the data packets via another route.

When a link fails, traffic is re-routed via at least one pre-determined backup network path. Each backup network path has the same beginning point and ending point as the corresponding primary network path but traverses in a direction opposite to the primary network path along the ring. For example, in the embodiment illustrated in FIG. 1, the backup network path 150 for link 126 begins at the fourth VDH 112 and ends at the fifth VDH 114, similar to the primary network path 142. Nonetheless, traffic along the backup network path 150 flows in a direction that is opposite to that of the primary network path 142. In an illustrative embodiment, the backup network path of each physical link can be statically pre-determined such that it traverses in the reverse direction of the primary network path. In another embodiment, the backup network path can be dynamically constructed through IP routing in a simple topology, for example a single ring.

In an illustrative embodiment, each link can include a plurality of fiber optics lines (sometimes referred to herein as "fiber cables"). For example, each link can include a first fiber cable and a second fiber cable, where each first fiber cable transmits data via a primary network path and each second fiber cable transmits data via a backup path that is the reverse of the primary network path. For instance, a first fiber cable of the fourth link 124 can transmit data downstream from the third VDH 110 to the fourth VDH 112, and a second fiber cable of the fourth link 124 can carry data upstream from the fourth VDH 112 to the third VDH 110. The ring topology can take advantage of the asymmetric nature of typical broadcast and multicast video content (i.e., downstream traffic from the video source is much bigger than upstream traffic) to improve the efficiency of bandwidth utilization on network links. For instance, re-routed traffic sent via the backup network path 150 due to a failure of the fifth link 126 can flow over the second (upstream) fiber cable of the fourth link 124 (and upstream fiber cables of links 122, 120, and so on) in a direction opposite to that of the primary network path 142.

In a particular illustrative embodiment, the first VHE 102 can receive video content from a content source via a satellite system. The first VHE 102 can send one or more data packets carrying the video content to the plurality of VDHs 106-116 via the links 118-128. For example, the first VHE 102 can send a data packet to the first VDH 106 via the first link 118. The first VDH 106 can send copies of the data packet to devices within its region or sub-region and send the data packet to the second VDH 108 via the second link 120. Thus, in an illustrative embodiment, a single copy of the data packet can be propagated through the plurality of VDHs 106-116 via the primary network paths 134-144.

In a particular embodiment, a link between two of the plurality of VDHs can fail due to physical damage, power failure or other failure condition. For example, the fifth link 126 between the fourth VDH 112 and the fifth VDH 114 can fail. The fourth VDH 112 can detect the link failure and determine that the primary network path 142 cannot be used to route the data packet to the fifth VDH 114. The fourth VDH 112 can determine, based on data stored at the fourth VDH 112, that a backup network path 150 that does not include the fifth link 126 will be used to send the data packet to the fifth VDH 114. The data stored at the fourth VDH 112 can indicate that the backup network path 150 is a pre-defined alternate to the primary network path 142 and flows in a direction opposite to the direction of the primary network path 142. In an illustrative embodiment, the primary network path 142 can include a downstream fiber cable of the fifth link 126, whereas the backup network path 150 can include an upstream fiber cable of the fourth link 124 and upstream fiber cables of the links 118-122 and 128-132.

Referring to FIG. 2, a second particular embodiment of a system to distribute digital content is illustrated and designated generally at 200. The system 200 includes a first video head-end (VHE) 202 that communicates with a video content source via a satellite system or other broadcast or data system. In a particular embodiment, the system 200 can include a second VHE 204, such as a back-up VHE, which also communicates with the video content source. The system 200 also includes a plurality of video distribution hubs (VDHs) 206-216 and 238-252, which are adapted to receive data packets, or copies of data packets, from the video head-ends 202, 204. In an illustrative embodiment, each of the VHEs and VDHs can include one or more devices, such as one or more servers, switches, routers, or other devices, where each device can be adapted to perform one or more of the functions of the VHE or VDH with respect to distributing digital content, such as receiving a data packet, sending a data packet, storing data, determining a network path, and other functions.

In a particular embodiment, the first VHE 202 and second VHE 204 can be adapted to communicate video content with user communications devices via the plurality of VDHs 206-216 and 238-252. For example, the first VHE 202 and second VHE 204 can be adapted to communicate multicast video content of an Internet Protocol Television (IPTV) system, to set-top box devices via the VDHs 206-216 and 238-252. In another particular embodiment, other content, such as voice content, data content, or any combination thereof, can be transmitted via the VDHs 206-216 and 238-252 to other user devices, such as Voice-over Internet Protocol (VoIP) phones, computing devices, other devices, or any combination thereof. In an illustrative embodiment, the first VHE 202 and the second VHE 204 can provide digital content over a national network, where the plurality of VDHs 206-216 and 238-252 serve a plurality of regions. In another embodiment, the first VHE 202 and the second VHE 204 can provide digital content over a regional network, where the plurality of VDHs 206-216 and 238-252 serve a plurality of neighborhoods or other sub-regions.

The first VHE 202, the second VHE 204, and the plurality of VDHs 206-216 and 238-252 comprise nodes of a cascaded network ring topology or similar architecture, in which a copy of a data packet sent by the first VHE 202 or the second VHE 204 is propagated through the plurality of VDHs 206-216 and 238-252 via multiple ring-like network architectures, where at least two of the rings share one or more common VDHs or other nodes, as well as the links of overlapped segments.

As illustrated in FIG. 2, the various nodes of the cascaded ring topology are connected via a plurality of links 218-232 and 253-258. For example, the first VHE 202 can communicate with a first VDH 206 via a first link 218. In addition, the first VDH 206 can communicate with a second VDH 208 via a second link 220. Further, the second VDH 208 can communicate with a third VDH 210 via a third link 222. In an illustrative embodiment, the second VDH 208 can also communicate with a seventh VDH 238, within a second ring of the cascaded ring architecture, via another link 254. In a particular embodiment, each of the links 218-232 and 253-258 is a Multi-Protocol Label Switching (MPLS) link.

In the example illustrated in FIG. 2, double links, such as links with double bandwidth, double physical links, or any combination thereof, can be included between the second VDH 208 and the third VDH 210 to allow re-routing of data packets along the backup network path 262, to prevent congestion in transmission of packets within this overlapped segment caused by re-routing of packets in the second network ring, for other reasons, or any combination thereof.

In an exemplary embodiment, the cascaded ring topology illustrated in FIG. 2 can be designed such that the directions of primary network paths in each individual ring minimize the need for double bandwidth on overlapped segments between two adjacent rings. Not only the quantity but also the length of overlapped segments can be minimized to reduce the capital cost of establishing the rings. For example, the cascaded ring topology can be designed such that directions of primary network paths in two adjacent rings are opposite wherever possible, in order to reduce double bandwidth requirements for overlapped segments.

In a particular illustrative embodiment, the first VHE 202 can receive video content from a content source. The first VHE 202 can send one or more data packets carrying the video content to the plurality of VDHs 206-216 in a first network ring via the links 218-228. For example, the first VHE 202 can send a data packet to the first VDH 206 via the first link 218. The first VDH 206 can send copies of the data packet to devices within its region or sub-region and send the data packet to the second VDH 208 via the second link 220. Thus, in an illustrative embodiment, a single copy of the data packet can be propagated through the VDHs 206-216 via the primary network paths 270-280.

In an exemplary embodiment, the second VDH 208 can send a copy of the data packet to the seventh VDH 238, which is a part of a second network ring, via another link 254. Further, the seventh VDH 238 can send copies of the data packet to devices within its region or sub-region and send the data packet to an eighth VDH 240 via a next link 256. Thus, in an illustrative embodiment, a copy of the data packet can be propagated through the VDHs 238-240 via the primary network paths 260-261 that are associated with the second network ring. In addition, a copy of the data packet can be propagated through the VDHs 242-244 via the primary network paths 264-265 that are associated with the third network ring. As illustrated in FIG. 2, a copy of the data packet can be propagated through additional network rings.

In a particular embodiment, a link between two VDHs can fail. For example, the fifth link 226 between the fourth VDH 212 and the fifth VDH 214 can fail. The fourth VDH 212 can detect the link failure and determine that the primary network path 278 cannot be used to route the data packet to the fifth VDH 214. The fourth VDH 212 can determine, based on data stored at the fourth VDH 212, that a backup network path 236 that does not include the fifth link 226 will be used to send the data packet to the fifth VDH 214. The data stored at the fourth VDH 212 can indicate that the backup network path 236 is a pre-defined alternate to the primary network path 278 and flows in a direction opposite to the direction of the primary network path 278. In an illustrative embodiment, the primary network path 278 can include a downstream fiber cable of the fifth link 226, whereas the backup network path 236 can include an upstream fiber cable of the fourth link 224 and upstream fiber cables of the links 218-222 and 228-232.

Alternatively, the fourth VDH 212 can determine, based on data stored at the fourth VDH 212, that the data packet, or a copy thereof, should be re-routed to the fifth VDH 214 via a secondary backup network path 268 associated with another network ring of which the fourth VDH 212 and fifth VDH 214 are nodes. For instance, the data stored at the fourth VDH 212 can indicate that the first backup network path 236 and the second backup network path 268 are alternates to the primary network path 278, and the fourth VDH 212 can select one of them based on traffic volume, available bandwidth, link cost, other factors, or any combination thereof.

In an illustrative, non-limiting example, the fourth VDH 212 can store the data as a look-up table that associates paths by which a data packet is received with one or more alternate paths to the fifth VDH 214. Where multiple alternate network paths are possible, such as the backup network path 236 and the second backup network path 268, the fourth VDH 212 can include logic to select one of the alternate network paths, for example, based on data traffic/bandwidth available for each alternate network path, a number of hops (i.e., between pairs of nodes) associated with each alternate network path, transmission speed of each alternate network path, other factors, or any combination thereof.

In another example, a link 256 between the seventh VDH 238 and the eighth VDH 240 can fail. The seventh VDH 238 can detect the link failure and determine that the primary network path 261 cannot be used to route the data packet to the eighth VDH 240. The seventh VDH 238 can determine, based on data stored at the seventh VDH 238, that a backup network path 262 that does not include the failed link 256 will be used to send the data packet to the eighth VDH 240. The data stored at the seventh VDH 238 can indicate that the backup network path 262 is a pre-defined alternate to the primary network path 261 and flows in a direction opposite to the direction of the primary network path 261. In an illustrative embodiment, the primary network path 261 can include a downstream fiber cable of the failed link 256, whereas the backup network path 262 can include an upstream fiber cable of the link 254 and can include link 253 of the double link between the second VDH 208 and the third VDH 210.

In another example, a link 258 between the ninth VDH 242 and the tenth VDH 244 can fail. The ninth VDH 242 can detect the link failure and determine that the primary network path 265 cannot be used to route the data packet to the tenth VDH 244. The ninth VDH 242 can determine, based on data stored at the ninth VDH 242, that a backup network path 266 that does not include the failed link 258 will be used to send the data packet to the tenth VDH 244. The data stored at the ninth VDH 242 can indicate that the backup network path 266 is a pre-defined alternate to the primary network path 265 and flows in a direction opposite to the direction of the primary network path 265. In an illustrative embodiment, the primary network path 265 can include a downstream fiber cable of the failed link 258, whereas the backup network path 266 can include an upstream fiber cable of the link 257.

Referring to FIG. 3, a third particular embodiment of a system to distribute digital content is illustrated and designated generally at 300. The system 300 includes a first video head-end (VHE) 302 that communicates with a video content source and a second VHE 304 that also communicates with the video content source. The system 300 also includes a plurality of video distribution hubs (VDHs) 306-316 and 338-352, which are adapted to receive data packets, or copies of data packets, from the video head-ends 302, 304.

In a particular embodiment, the first VHE 302 and second VHE 304 can be adapted to communicate video content with user communications devices via the plurality of VDHs 306-316 and 338-352. For example, the first VHE 302 and second VHE 304 can be adapted to communicate multicast video content of an Internet Protocol Television (IPTV) system, to set-top box devices via the VDHs 306-316 and 338-352. In another particular embodiment, other content, such as voice content, data content, or any combination thereof, can be transmitted via the VDHs to other user devices, such as Voice-over Internet Protocol (VoIP) phones, computing devices, other devices, or any combination thereof. In an illustrative embodiment, the first VHE 302 and the second VHE 304 can provide digital content over a national network, where the plurality of VDHs 306-316 and 338-352 serve a plurality of regions. In another embodiment, the first VHE 302 and the second VHE 304 can provide digital content over a regional network, where the plurality of VDHs 306-316 and 338-352 serve a plurality of neighborhoods or other sub-regions.

The first VHE 302, the second VHE 304, and the plurality of VDHs 306-316 and 338-352 comprise nodes of a cascaded network ring topology or similar architecture, in which a copy of a data packet sent by the first VHE 302 or the second VHE 304 is propagated through the plurality of VDHs 306-316 and 338-352 via multiple ring-like network architectures, where at least two of the rings share one or more common VDHs or other nodes, as well as the links of overlapped segments.

As illustrated in FIG. 3, the various nodes of the cascaded ring topology are connected via a plurality of links 318-332 and 353-358. For example, the first VHE 302 can communicate with a first VDH 306 via a first link 318. In addition, the first VDH 306 can communicate with a second VDH 308 via a second link 320. Further, the second VDH 308 can communicate with a third VDH 310 via a third link 322. In an illustrative embodiment, the second VDH 308 can also communicate with a seventh VDH 338, within a second ring of the cascaded ring architecture, via another link 354. In a particular embodiment, each of the links 318-332 and 353-358 is a Multi-Protocol Label Switching (MPLS) link.

In a particular illustrative embodiment, the first VHE 302 can cease receiving video content from a content source, for example, due to loss of connection with, or failure of, a satellite system or other receiving system at the first VHE 302. However, it can still pass data traffic received from the second VHE 304 and from the first VDH 306. In this embodiment, the second VHE 304 can receive the video content from the content source or an alternate content source and can send one or more data packets carrying the video content to the plurality of VDHs 306-316 in a first network ring via the links 332 and 318-328. For example, the second VHE 304 can send a data packet to the first VHE 302 via the link 332, and the first VHE 304 can send the data packet to the first VDH 306 via the link 318. The first VDH 306 can send copies of the data packet to devices within its region or sub-region and send the data packet to the second VDH 308 via a next link 320. Thus, in an illustrative embodiment, a single copy of the data packet sent by the second VHE 304 can be propagated through the VDHs 306-316 via the primary network paths 334 and 370-380 in the first network ring.

In an exemplary embodiment, the second VDH 308 can send a copy of the data packet to the seventh VDH 338, which is a part of a second network ring, via another link 354. Further, the seventh VDH 338 can send copies of the data packet to devices within its region or sub-region and send the data packet to an eighth VDH 340 via a next link 356. Thus, in an illustrative embodiment, a copy of the data packet can be propagated through the VDHs 338-340 via the primary network paths 360-361 that is associated with the second network ring. In addition, a copy of the data packet can be propagated through the VDHs 342-344 via the primary network paths 364-365 that is associated with the third network ring.

In a particular embodiment, a link between two VDHs can fail. For example, the fifth link 326 between the fourth VDH 312 and the fifth VDH 314 can fail. The fourth VDH 312 can detect the link failure and determine that the primary network path 378 cannot be used to route the data packet to the fifth VDH 314. The fourth VDH 312 can determine, based on data stored at the fourth VDH 312, that a backup network path 336 that does not include the fifth link 326 will be used to send the data packet to the fifth VDH 314. The data stored at the fourth VDH 312 can indicate that the backup network path 336 is a pre-defined alternate to the primary network path 378 and flows in a direction opposite to the direction of the primary network path 378. In an illustrative embodiment, the primary network path 378 can include a downstream fiber cable of the fifth link 326, whereas the backup network path 336 can include an upstream fiber cable of the fourth link 324 and upstream fiber cables of the links 318-322 and 328-332.

Alternatively, the fourth VDH 312 can determine, based on data stored at the fourth VDH 312, that the data packet, or a copy thereof, should be re-routed to the fifth VDH 314 via a secondary backup network path 368 associated with another network ring of which the fourth VDH 312 and fifth VDH 314 are nodes. For instance, the data stored at the fourth VDH 312 can indicate that the first backup network path 336 and the second backup network path 368 are alternates to the primary network path 378, and the fourth VDH 312 can select one of them based on traffic volume, available bandwidth, link cost, other factors, or any combination thereof.

In an illustrative, non-limiting example, the fourth VDH 312 can store the data as a look-up table that associates paths by which a data packet is received with one or more alternate paths to the fifth VDH 314. Where multiple alternate network paths are possible, such as the backup network path 336 and the second backup network path 368, the fourth VDH 312 can include logic to select one of the alternate network paths, for example, based on data traffic/bandwidth available for each alternate network path, a number of hops (i.e., between pairs of nodes) associated with each alternate network path, transmission speed of each alternate network path, other factors, or any combination thereof.

In another example, a link 356 between the seventh VDH 338 and the eighth VDH 340 can fail. The seventh VDH 338 can detect the link failure and determine that the primary network path 361 cannot be used to route the data packet to the eighth VDH 340. The seventh VDH 338 can determine, based on data stored at the seventh VDH 338, that a backup network path 362 that does not include the failed link 356 will be used to send the data packet to the eighth VDH 340. The data stored at the seventh VDH 338 can indicate that the backup network path 362 is a pre-defined alternate to the primary network path 361 and flows in a direction opposite to the direction of the primary network path 361. In an illustrative embodiment, the primary network path 361 can include a downstream fiber cable of the failed link 356, whereas the backup network path 362 can include an upstream fiber cable of the link 354 and can include link 353 of the double link between the second VDH 308 and the third VDH 310.

In another example, a link 358 between the ninth VDH 342 and the tenth VDH 344 can fail. The ninth VDH 342 can detect the link failure and determine that the primary network path 365 cannot be used to route the data packet to the tenth VDH 344. The ninth VDH 342 can determine, based on data stored at the ninth VDH 342, that a backup network path 366 that does not include the failed link 358 will be used to send the data packet to the tenth VDH 344. The data stored at the ninth VDH 342 can indicate that the backup network path 366 is a pre-defined alternate to the primary network path 365 and flows in a direction opposite to the direction of the primary network path 365. In an illustrative embodiment, the primary network path 365 can include a downstream fiber cable of the failed link 358, whereas the backup network path 366 can include an upstream fiber cable of the link 357.

Referring to FIG. 4, a third particular embodiment of a system to distribute digital content is illustrated and designated generally at 400. The system 400 includes a first video head-end (VHE) 402 that communicates with a video content source and a second VHE 404 that also communicates with the video content source. The system 400 also includes a plurality of video distribution hubs (VDHs) 406-416 and 438-452, which are adapted to receive data packets, or copies of data packets, from the video head-ends 402, 404.

In a particular embodiment, the first VHE 402 and second VHE 404 can be adapted to communicate video content with user communications devices via the plurality of VDHs 406-416 and 438-452. For example, the first VHE 402 and second VHE 404 can be adapted to communicate multicast video content of an Internet Protocol Television (IPTV) system, to set-top box devices via the VDHs 406-416 and 438-452. In another particular embodiment, other content, such as voice content, data content, or any combination thereof, can be transmitted via the VDHs to other user devices, such as Voice-over Internet Protocol (VoIP) phones, computing devices, other devices, or any combination thereof. In an illustrative embodiment, the first VHE 402 and the second VHE 404 can provide digital content over a national network, where the plurality of VDHs 406-416 and 438-452 serve a plurality of regions. In another embodiment, the first VHE 402 and the second VHE 404 can provide digital content over a regional network, where the plurality of VDHs 406-416 and 438-452 serve a plurality of neighborhoods or other sub-regions.

The first VHE 402, the second VHE 404, and the plurality of VDHs 406-416 and 438-452 comprise nodes of a cascaded network ring topology or similar architecture, in which a copy of a data packet sent by the first VHE 402 or the second VHE 404 is propagated through the plurality of VDHs 406-416 and 438-452 via multiple ring-like network architectures, where at least two of the rings share one or more common VDHs or other nodes, as well as the links of overlapped segments.

As illustrated in FIG. 4, the various nodes of the cascaded ring topology are connected via a plurality of links 418-432 and 453-458. For example, the first VHE 402 can communicate with a first VDH 406 via a first link 418. In addition, the first VDH 406 can communicate with a second VDH 408 via a second link 420. Further, the second VDH 408 can communicate with a third VDH 410 via a third link 422. In an illustrative embodiment, the second VDH 408 can also communicate with a seventh VDH 438, within a second ring of the cascaded ring architecture, via another link 454. In a particular embodiment, each of the links 418-432 and 453-458 is a Multi-Protocol Label Switching (MPLS) link.

In a particular illustrative embodiment, the first VHE 402 can cease functioning as a node due to mechanical or technical difficulty, such that it cannot receive or transmit any traffic (i.e., the first VHE 402 is out of service). In this embodiment, the second VHE 404 receives video content from a content source and sends one or more data packets carrying the video content to the plurality of VDHs 406-416 in a first network ring via the primary network paths 434 and 470-478.

In a particular embodiment, the primary network paths 434 and 470-478 can be pre-configured and are enabled through IP routing convergence after the failure of VHE 402 is detected by the network. In an illustrative embodiment, the second VHE 404 can determine that there is a node failure at the first VHE 402 and that data packets cannot be sent to the VDHs 406-416 by a network path that includes the first VHE 402. The VHE 404 can determine based on IP routing that the data packets will be sent via an enabled primary network path 434 to the sixth VDH 416. Hence, the second VHE 404 can send a data packet to the sixth VDH 416 via the link 430. The sixth VDH 416 can send copies of the data packet to devices within its region or sub-region and send the data packet to the fifth VDH 414 via a next link 428 along the primary path 470.

Thus, a single copy of the data packet can be propagated through the VDHs 406-416 via the enabled primary network paths 434 and 470-478.

In a particular embodiment, a link between two VDHs can fail. For example, the link 424 between the fourth VDH 412 and the third VDH 410 can fail. The fourth VDH 412 can detect the link failure and determine that the primary network path 474 cannot be used to route the data packet to the third VDH 410. The fourth VDH 412 can determine, based on data stored at the fourth VDH 412, that a backup network path 468 that does not include the failed link 424 will be used to send the data packet to the third VDH 410. The data stored at the fourth VDH 412 can indicate that the backup network path 468 is a pre-defined alternate to the primary network path 478. There may be another backup network path pre-defined along the first network ring, but it is disabled due to the first VHE 402 node failure. Hence, the fourth VDH 412 may determine that the only available backup path in this embodiment would be the backup network path 468.

In an illustrative embodiment, each of the links 418-432 can include a downstream fiber cable that carries data traffic from one or more of the VHEs 402-404 to each of the VDHs 406-416 via the primary network paths 434 and 470-478, and an upstream fiber cable that carries data traffic from the VDHs 406-416 to one or more of the VHEs 402-404. In the embodiment shown, downstream traffic originating at the second VHE 404 can be transmitted via the fiber cables in a counterclockwise direction. In a particular embodiment, the upstream and downstream fiber cables of each physical link can be re-designated. In the embodiment illustrated in FIG. 4, the network paths 460-468 need not be reversed (i.e., which is used in the absence of a failed link and which is used to re-route data packets when a link fails) due to the node failure at the first VHE 402.

In another example, a link 456 between the seventh VDH 438 and the eighth VDH 440 can fail. The seventh VDH 438 can detect the link failure and determine that the primary network path 461 cannot be used to route the data packet to the eighth VDH 440. The seventh VDH 438 can determine, based on data stored at the seventh VDH 438, that a backup network path 462 that does not include the failed link 456 will be used to send the data packet to the eighth VDH 440. The data stored at the seventh VDH 438 can indicate that the backup network path 462 is a pre-defined alternate to the primary network path 461 and flows in a direction opposite to the direction of the primary network path 461. In an illustrative embodiment, the primary network path 461 can include a downstream fiber cable of the failed link 456, whereas the backup network path 462 can include an upstream fiber cable of the link 454 and can include link 453 of the double link between the second VDH 408 and the third VDH 410.

In another example, a link 458 between the ninth VDH 442 and the tenth VDH 444 can fail. The ninth VDH 442 can detect the link failure and determine that the primary network path 465 cannot be used to route the data packet to the tenth VDH 444. The ninth VDH 442 can determine, based on data stored at the ninth VDH 442, that a backup network path 466 that does not include the failed link 458 will be used to send the data packet to the tenth VDH 444. The data stored at the ninth VDH 442 can indicate that the backup network path 466 is a pre-defined alternate to the primary network path 465 and flows in a direction opposite to the direction of the primary network path 465. In an illustrative embodiment, the primary network path 465 can include a downstream fiber cable of the failed link 458, whereas the backup network path 466 can include an upstream fiber cable of the link 457.

With respect to the foregoing, the terms "first," "second," etc., are used for convenience of explanation and are not intended to convey a necessary sequence of events or to designate only a referenced element, such as a particular link, VHE or VDH. For example, "first" and "second" links could be relative to a particular VDH, such that any VDH receives data via a first link and sends data via a second link. In addition, the network paths used to transmit data in the absence of link failures and the paths used to re-route data are provided only for illustration and not to demonstrate that data must move downstream in a particular direction (such as clockwise about a network ring) or that data must move upstream in a particular direction (such as counterclockwise about a network ring). Further, data traffic can include video content, voice content, data content, or any combination thereof, and can be communicated to any suitable distribution hubs from video head-ends of an IPTV system or other triple-play or quad-play system.

Figure 5:
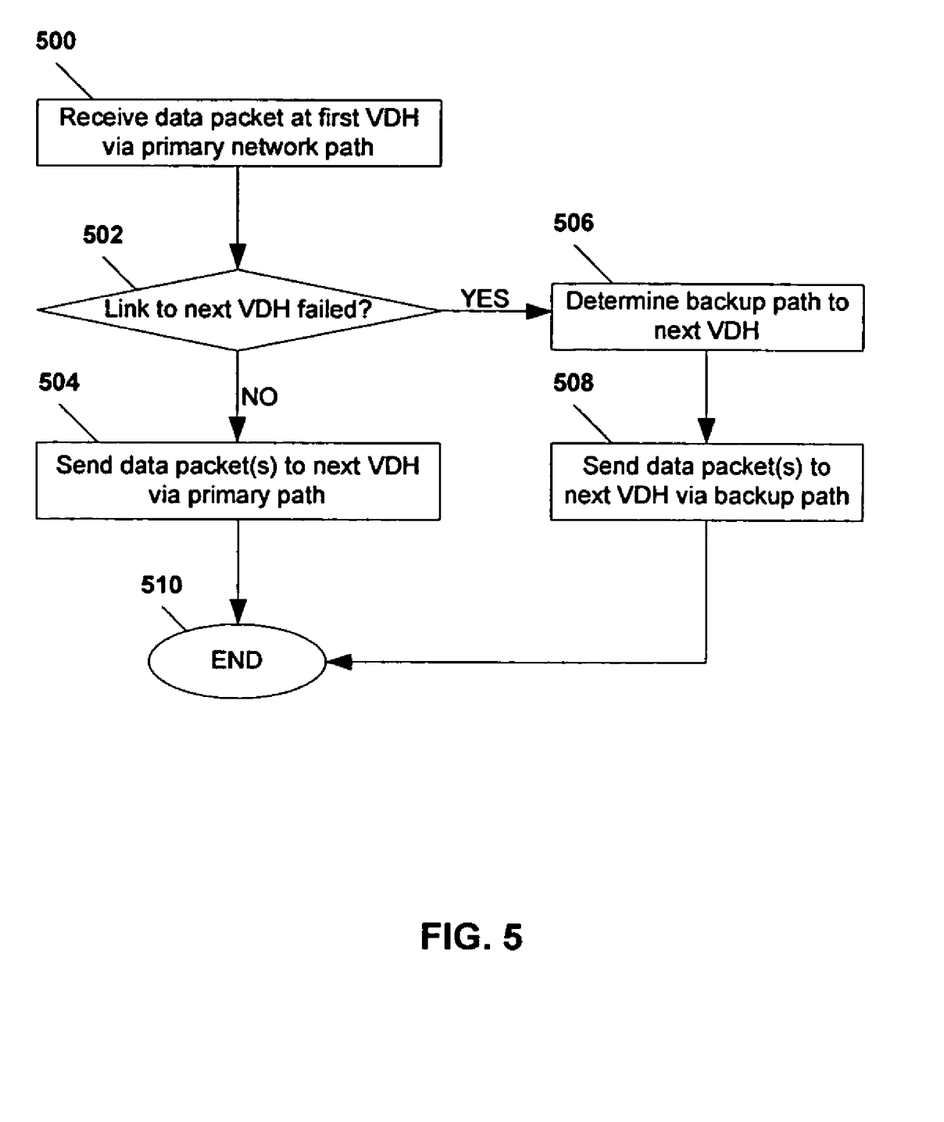
FIG. 5 is a flow diagram of a particular illustrative embodiment of a method of distributing digital content.

Referring to FIG. 5, a particular illustrative embodiment of a method of providing communications services is illustrated. At block 500, a first video distribution hub of a network ring receives a data packet via a primary network path. In an illustrative embodiment, the data packet can be received from a video head-end or can be a copy of a data packet sent by the video head-end to a prior video distribution hub coupled to the first video distribution hub. The first video distribution hub can receive the data packet via a first link.

Moving to decision step 502, the first video distribution hub can determine whether a link to a next video distribution hub has failed. The next video distribution hub can be a video distribution hub of the same ring as the first video distribution hub. Alternatively, the next video distribution hub can be a video distribution hub of an overlapping ring in a cascaded ring topology.

If the first video distribution hub determines that there is not a link failure, the method continues to block 504, and the first video distribution hub sends the data packet, or a copy thereof, to the next video distribution hub via a primary path. On the other hand, if the first video distribution hub determines that there is a failure of a link between the first video distribution hub and the next video distribution hub, the method proceeds to block 506, and the first video distribution hub determines a backup network path to send the data packet, or a copy thereof, to the next video distribution hub, based on data stored at the first video distribution hub. In a particular embodiment, the first video distribution hub can select a backup network path from a plurality of potential backup network paths based on link cost, a number of hops (i.e., between pairs of nodes), traffic volume, bandwidth availability, type of data packet, other IP routing factors, or any combination thereof. Moving to block 508, the first video distribution hub sends the data packet, or a copy thereof, to the next video distribution hub via the backup network path. The method terminates at 510.

Figure 6:
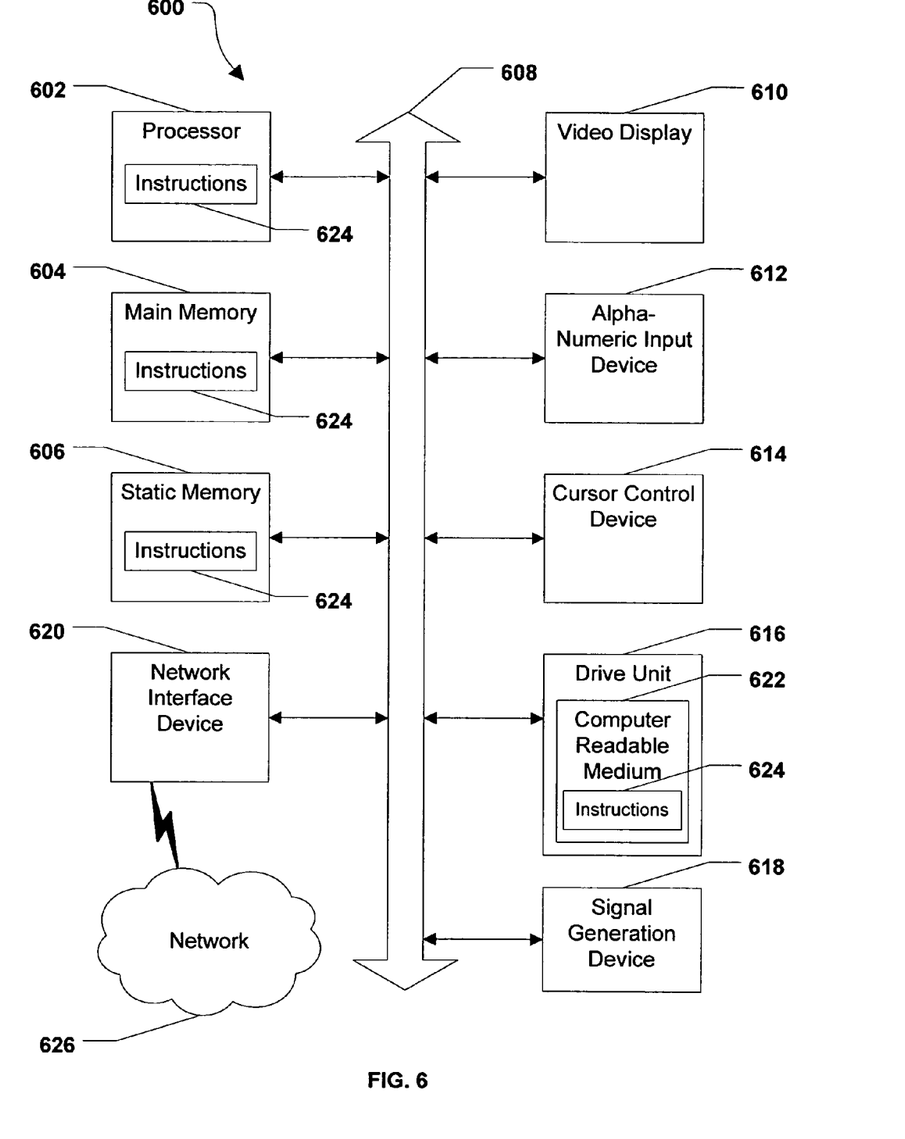
FIG. 6 is a diagram of an illustrative embodiment of a general computer system.

Referring to FIG. 6, an illustrative embodiment of a general computer system is shown and is designated 600. The computer system 600 can include a set of instructions that can be executed to cause the computer system 600 to perform any one or more of the methods or computer based functions disclosed herein. The computer system 600, or any portion thereof, may operate as a standalone device or may be connected, e.g., using a network, to other computer systems or peripheral devices, including systems or devices of a video head-end, video distribution hub, IP router, or any combination thereof, as illustrated in FIGS. 1-4.

In a networked deployment, the computer system may operate in the capacity of a video head end system or device, a video distribution hub system or device, or other device. The computer system 600 can also be implemented as or incorporated into various user communication devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 600 can be implemented using electronic devices that provide voice, video or data communication. Further, while a single computer system 600 is illustrated, the term "system" shall also be taken to include any collection of systems or sub-systems that individually or jointly execute a set, or multiple sets, of instructions to perform one or more computer functions.

As illustrated in FIG. 6, the computer system 600 may include a processor 602, e.g., a central processing unit (CPU), a graphics-processing unit (GPU), or both. Moreover, the computer system 600 can include a main memory 604 and a static memory 606 that can communicate with each other via a bus 608. As shown, the computer system 600 may further include a video display unit 610, such as a liquid crystal display (LCD), an organic light emitting diode (OLED), a flat panel display, a solid state display, or a cathode ray tube (CRT). Additionally, the computer system 600 may include an input device 612, such as a keyboard, and a cursor control device 614, such as a mouse. The computer system 600 can also include a disk drive unit 616, a signal generation device 618, such as a speaker or remote control, and a network interface device 620.

In a particular embodiment, as depicted in FIG. 6, the disk drive unit 616 may include a computer-readable medium 622 in which one or more sets of instructions 624, e.g. software, can be embedded. Further, the instructions 624 may embody one or more of the methods or logic as described herein. In a particular embodiment, the instructions 624 may reside completely, or at least partially, within the main memory 604, the static memory 606, and/or within the processor 602 during execution by the computer system 600. The main memory 604 and the processor 602 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 624 or receives and executes instructions 624 responsive to a propagated signal, so that a device connected to a network 626 can communicate voice, video or data over the network 626. Further, the instructions 624 may be transmitted or received over the network 626 via the network interface device 620.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In accordance with various embodiments, the methods described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. The software may also utilize a signal containing computer instructions. A digital file attachment to e-mail or other self-contained information archive or set of archives is considered a distribution medium equivalent to a tangible storage medium. Accordingly, the disclosure is considered to include a tangible storage medium or distribution medium as listed herein, and other equivalents and successor media, in which the software implementations herein may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A system to distribute digital content, the system comprising:
a first network ring comprising a first video distribution hub and a second video distribution hub, wherein the first video distribution hub is coupled to a first link and to a second link, wherein the first video distribution hub and the second video distribution hub are associated with a first network ring, a second network ring, and a third network ring of a cascaded network ring architecture, the first video distribution hub adapted to:
when the second link is intact, send a data packet, or a copy of the data packet, from the first video distribution hub to the second video distribution hub via a primary network path that includes the second link and that excludes the first link; and
when the second link has failed, send the data packet, or the copy of the data packet, from the first video distribution hub to the second video distribution hub via a backup network path that includes the first link and that does not include the second link, wherein the backup network path is selected from one of a primary backup network path, a secondary backup network path, and a tertiary backup network path based on one or more selection factors, wherein the primary backup network path includes a first plurality of nodes of the first network ring, the secondary backup network path includes a second plurality of nodes of the second network ring, the tertiary backup network path includes a third plurality of nodes of the third network ring, and wherein at least one node of the first plurality of nodes differs from each of the second plurality of nodes and at least one node of the third plurality of nodes differs from each node of the first plurality of nodes and differs from each node of the second plurality of nodes.

2. A network comprising:
a first video distribution hub and a second video distribution hub, wherein the first video distribution hub is coupled to a first link and a second link, wherein the first video distribution hub and the second video distribution hub are associated with a first network ring, a second network ring, and a third network ring of a cascaded network ring architecture; and
path selection logic configured to select a backup network path from one of a primary backup network path, a secondary backup network path, and a tertiary backup path based on one or more selection factors, wherein the primary backup path includes a first plurality of nodes of the first network ring, wherein the secondary backup network path includes a second plurality of nodes of the second network ring, wherein the tertiary backup path includes a third plurality of nodes of the third network ring, and wherein at least one node of the first plurality of nodes is different from each of the second plurality of nodes and at least one node of the third plurality of nodes differs from each node of the first plurality of nodes and differs from each node of the second plurality of nodes, wherein:
when the first link is intact, a data packet or a copy of the data packet is routed from the first video distribution hub to the second video distribution hub via a primary network path that includes the first link; and
when the first link has failed, the data packet or the copy of the data packet is routed from the first video distribution hub to the second video distribution hub via the selected backup network path, wherein the selected backup network path includes the second link but does not include the first link.

3. The network of claim 2, wherein the plurality of nodes includes a video head-end associated with the first network ring, and wherein a single copy of the data packet is propagated from the video head-end to each video distribution hub of the first network ring.

4. The network of claim 2, wherein the data packet includes multicast video content, and wherein the routing the data packet via the selected backup network path results in a recovery time of approximately fifty milliseconds (50 ms).

5. The system of claim 1, wherein the one or more selection factors include at least a data traffic volume associated with each of the primary backup network path, the secondary backup network path, and the tertiary backup path.

6. The system of claim 1, wherein the one or more selection factors include at least an available bandwidth associated with each of the primary backup network path, the secondary backup network path, and the tertiary backup path.

7. The system of claim 1, wherein the one or more selection factors include at least a link cost associated with each of the primary backup network path, the secondary backup network path, and the tertiary backup path.

8. The system of claim 1, wherein the one or more selection factors include at least a number of hops between nodes associated with each of the primary backup network path, the secondary backup network path, and the tertiary backup path.

9. The system of claim 1, wherein the one or more selection factors include at least a transmission speed associated with each of the primary backup network path, the secondary backup network path, and the tertiary backup path.

10. The network of claim 2, wherein the one or more selection factors include at least a data traffic volume associated with each of the primary backup network path, the secondary backup network path, and the tertiary backup path.

11. The network of claim 2, wherein the one or more selection factors include at least an available bandwidth associated with each of the primary backup network path, the secondary backup network path, and the tertiary backup path.

12. The network of claim 2, wherein the one or more selection factors include at least a link cost associated with each of the primary backup network path, the secondary backup network path, and the tertiary backup path.

13. The network of claim 2, wherein the one or more selection factors include at least a number of hops between nodes associated with each of the primary backup network path, the secondary backup network path, and the tertiary backup path.

14. The network of claim 2, wherein the one or more selection factors include at least a transmission speed associated with each of the primary backup network path, the secondary backup network path, and the tertiary backup path.

15. A method comprising:
sending a data packet, or a copy of the data packet, from a first video distribution hub to a second video distribution hub, wherein the first video distribution hub is coupled to a first link and to a second link, wherein the first video distribution hub and the second video distribution hub are associated with a first network ring, a second network ring, and a third network ring of a cascaded network ring architecture, wherein sending comprises:
when the second link is intact, sending the data packet, or the copy of the data packet, from the first video distribution hub to the second video distribution hub via a primary network path that includes the second link and excludes the first link; and
when the second link has failed, sending the data packet, or the copy of the data packet, from the first video distribution hub to the second video distribution hub via a backup network path that includes the first link and that does not include the second link, wherein the backup network path is selected from one of a primary backup network path, a secondary backup network path, and a tertiary backup path based on one or more selection factors;
wherein the primary backup network path includes a first plurality of nodes of the first network ring;
wherein the secondary backup network path includes a second plurality of nodes of the second network ring;
wherein the tertiary backup path includes a third plurality of nodes of the third network ring; and
wherein at least one node of the first plurality of nodes differs from each of the second plurality of nodes and at least one node of the third plurality of nodes differs from each node of the first plurality of nodes and differs from each node of the second plurality of nodes.

16. The method of claim 15, wherein the one or more selection factors includes at least a data traffic volume associated with each of the primary backup network path, the secondary backup network path, and the tertiary backup path.

17. The method of claim 15, wherein the one or more selection factors includes at least an available bandwidth associated with each of the primary backup network path, the secondary backup network path, and the tertiary backup path.

18. The method of claim 15, wherein the one or more selection factors includes at least a link cost associated with each of the primary backup network path, the secondary backup network path, and the tertiary backup path.

19. The method of claim 15, wherein the one or more selection factors includes at least a number of hops between nodes associated with each of the primary backup network path, the secondary backup network path, and the tertiary backup path.

20. The method of claim 15, wherein the one or more selection factors includes at least a transmission speed associated with each of the primary backup network path, the secondary backup network path, and the tertiary backup path.

21. The method of claim 15, wherein the one or more selection factors includes at least a data traffic volume associated with each of the primary backup network path, the secondary backup network path, and the tertiary backup path.

22. The method of claim 15, wherein the one or more selection factors includes at least an available bandwidth associated with each of the primary backup network path, the secondary backup network path, and the tertiary backup path.

23. The method of claim 15, wherein the one or more selection factors includes at least a link cost associated with each of the primary backup network path, the secondary backup network path, and the tertiary backup path.

24. The method of claim 15, wherein the one or more selection factors includes at least a number of hops between nodes associated with each of the primary backup network path, the secondary backup network path, and the tertiary backup path.

25. The method of claim 15, wherein the one or more selection factors includes at least a transmission speed associated with each of the primary backup network path, the secondary backup network path, and the tertiary backup path.

* * * * *